(12) United States Patent
Shigehiro

(10) Patent No.: US 8,978,307 B2
(45) Date of Patent: Mar. 17, 2015

(54) SEALING STRUCTURE OF PARTING PORTION

(71) Applicant: Nishikawa Rubber Co., Ltd., Hiroshima-shi, Hiroshima-ken (JP)

(72) Inventor: Yasuaki Shigehiro, Hiroshima (JP)

(73) Assignee: Nishikawa Rubber Co., Ltd., Hiroshima-Shi, Hiroshima-Ken (JP)

( * ) Notice: Subject to any disclaimer, the term of this patent is extended or adjusted under 35 U.S.C. 154(b) by 0 days.

(21) Appl. No.: 14/176,673

(22) Filed: Feb. 10, 2014

(65) Prior Publication Data

US 2014/0223830 A1    Aug. 14, 2014

(30) Foreign Application Priority Data

Feb. 13, 2013  (JP) ................................. 2013-025403
Jan. 22, 2014  (JP) ................................. 2014-009168

(51) Int. Cl.
| | | |
|---|---|---|
| *E06B 7/232* | (2006.01) | |
| *E06B 7/23* | (2006.01) | |
| *B60J 10/00* | (2006.01) | |
| *B60J 10/08* | (2006.01) | |

(52) U.S. Cl.
CPC .............. *E06B 7/23* (2013.01); *B60J 10/0005* (2013.01); *B60J 10/0014* (2013.01); *B60J 10/0031* (2013.01); *B60J 10/0062* (2013.01); *B60J 10/086* (2013.01)
USPC ....................................................... 49/496.1

(58) Field of Classification Search
USPC ........................... 49/475.1, 490.1, 496.1, 502
See application file for complete search history.

(56) References Cited

U.S. PATENT DOCUMENTS

| | | | | |
|---|---|---|---|---|
| 4,419,844 A | * | 12/1983 | Kreisfeld | ..................... 49/475.1 |
| 4,957,301 A | * | 9/1990 | Clay et al. | ..................... 277/345 |
| 5,010,691 A | * | 4/1991 | Takahashi | ..................... 49/482.1 |
| 5,154,952 A | * | 10/1992 | Nozaki | ........................... 428/37 |
| 5,347,759 A | * | 9/1994 | Kobayashi et al. | .......... 49/496.1 |
| 6,070,363 A | * | 6/2000 | Vance | .............................. 49/377 |
| 6,397,525 B1 | * | 6/2002 | Ishibashi et al. | ............. 49/484.1 |
| 6,536,161 B2 | * | 3/2003 | Saito | ................................ 49/368 |

FOREIGN PATENT DOCUMENTS

| | | | | | |
|---|---|---|---|---|---|
| GB | | 2142073 A | * | 1/1985 | ................ E06B 7/23 |
| JP | | 2000-264065 A | | 9/2000 | |

* cited by examiner

*Primary Examiner* — Jerry Redman
(74) *Attorney, Agent, or Firm* — Lucas & Mercanti LLP; Robert P. Michal

(57) ABSTRACT

In a sealing structure for closing a parting portion between a front door and a rear door by a seal lip, in which: the front door has a front side weather strip installed on a peripheral edge thereof; the front side weather strip makes elastic contact with a center pillar; the seal lip has a substantially tongue-shaped cross section, is disposed at a rear side weather strip and has a an assembly part formed on a base root side thereof; and the assembly part is assembled on the rear door; the base root side has a bending point provided thereon for the seal lip to be curved toward the inner-cabin side so that a top end makes elastic contact with the center pillar when high pressure water splashes the seal lip.

17 Claims, 6 Drawing Sheets

SEALING STRUCTURE OF PARTING PORTION

CROSS REFERENCE TO RELATED APPLICATIONS

This application claims the benefit under 35 USC §119 of JP Patent Applications JP 2013-025403 filed Feb. 13, 2013 and JP 2014-009168 filed Jan. 22, 2014, the entire disclosure of each of which is incorporated herein by reference.

BACKGROUND INFORMATION

The present invention relates to sealing structure of parting portions for closing and sealing the parting portions between rear ends of front doors and front ends of rear doors by parting seals provided on the front ends of the rear doors of four-door sedans or the like.

As shown in FIG. 7 to FIG. 11, an ordinary structure of closing and sealing a parting portion between a rear end of a front door 2 and a front end of a rear door 1 from an inner-cabin sides by a seal lip 30 has been disclosed (see, for example, Japanese unexamined Patent Publication No, 2000-264065). The seal lip 30 diverges from an upper part of a front end of a rear side weather strip 10 installed on a peripheral edge of a rear door 1 of the four-door sedan or the like and extends downward.

The seal lip 30 has an assembly part 32 formed on a base root 31b side thereof, Which is installed on the front end of the rear door 1. While structures of the assembly parts 32 vary, the assembly part 32 of FIG. 7 to FIG. 11 has a substantially U-shaped cross section for guiding a head 5a of a rail member 5 therein. As shown in FIG. 11, the rail member 5 is fixed on the front end of the rear door 1 by welding or the like and has a substantially T-shaped cross section which continuously extends in an upward and downward direction.

As shown in FIG. 8, when the front door 2 is closed, a hollow seal member 22 of a front side weather strip 20 of which an installation member 21 is installed on a peripheral edge of the front door 2 via a clip 6 makes elastic contact with an outer-cabin side on a front side of a center pillar 4. In the same manner, when the rear door 1 is dosed, a hollow seal member 12 of a rear side weather strip 10 of which an installation member 11 is installed on a fitting part 7 formed by bending an inner panel on a peripheral edge of the rear door 1 makes elastic contact with the outer-cabin side on a rear side of the center pillar 4.

According to the structure, the seal lip 30 decreases noise by wind which enters from the parting portion between the rear end of the front door 2 and the front end of the rear door 1 and prevents degradation in external appearance caused by the center pillar 4 visible from the parting portion.

A top end 31a side of the ordinary seal lip 30 is made of sponge rubber material while a base root 31b side is made of solid rubber material. Also, an inner-cabin side of a border between the sponge rubber material and the solid rubber material, which is a bending point 100 for the seal lip 30 to bend, is on the parting portion side on the front side of the rear door 1 (a tip side on the front side of the rear door 1) as shown in FIG. 9. Accordingly, when high pressure water 700 splashes the seal lip 30 from an outer-cabin side through the parting portion while spraying water for washing the automobiles or thunderstorm, the top end 31 a side of the seal lip 30 is curved in a manner to warp toward the inner-cabin side around the bending point 100.

In this circumstance, the top end 31a side of the seal lip 30 is curved toward the inner-cabin side (two-dotted line in FIG. 9) without making elastic contact with the center pillar 4, thereby forming a flow channel in a diagonally frontward direction from the parting portion toward the inner-cabin side.

As a result, as shown in FIG. 8, there has remained a problem that the high pressure water 700 guided along the flow channel thus formed directly hits a triangular space 9 formed by elastic contact between the hollow seal member 22 of the front side weather strip 20 and the center pillar 4 and that water enters the inner-cabin side from a space between the front side weather strip 20 and the center pillar 4.

Therefore, an object of the present invention is to provide the sealing structure of the parting portions, capable of controlling water leak by the high pressure water which splashes the parting portions.

SUMMARY

In order to achieve the above-mentioned object, according to one aspect of the invention, a sealing structure of a parting portion is provided, for closing the parting portion between a rear end of a front door (2) and a front end of a rear door (1) by a seal lip (40) from an inner-cabin side, the front door (2) having a front side weather strip (20) installed on a peripheral edge thereof, the front side weather strip (20) making elastic contact with a center pillar (4), the seal lip (40) having a substantially tongue-shaped cross section, the seal lip (40) disposed at an upper part of a front end of a rear side weather strip (10) is installed on a peripheral edge of a. rear door (1) and extending downward, the seal lip (40) having a an assembly part (42) formed on a base root (41b) side thereof, the assembly part (42) being assembled on the front end of the rear door (1), wherein the base root (41b) side of said seal lip (40) has a bending point (200) provided thereon for said seal lip (40) to be curved toward the inner-cabin side so that a top end (41a) side makes elastic contact with said center pillar (4) when high pressure water (700) splashes said seal lip (40) while spraying water for washing an automobile or the like.

In addition, according to an aspect of the present invention, thickness (401) of the top end (41a) of said seal lip (40) is thicker than thickness (402) of at least one other curved part of the seal lip (40).

In addition, according to an. aspect of the present invention, the top end (41a) of said seal lip (40) is bent toward an outer-cabin side.

In addition, according to an aspect of the present invention, the top end (41a) side of said seal lip (40) is made of sponge material while the base root (41b) side is made of solid material, and said bending point (200) is on an inner-cabin side of a border between the sponge material and the solid material, In addition, according to an aspect of the present invention, said bending point (200) is a notch (501) provided from the inner-cabin side.

In addition, according to an aspect of the present invention, position on an outer-cabin side (41c) of the top end (41a) of said seal lip (40) making elastic contact with said center pillar (4) is on the outer-cabin side compared with position of a tip (22a) on the rear door (1) side of a hollow seal member (22) of said front side weather strip (20) making elastic contact with said center pillar (4) and bending.

Symbols in parentheses show constituents or items corresponding to the drawings.

According to the sealing structure of the parting portion of the present invention, the bending point is provided on the base root side of the seal lip which closes the parting portion between the rear end of the front door and the front end of the rear door from the inner-cabin side so that, when the high pressure water splashes the seal lip while spraying water for washing the automobile or the like, the seal lip is curved toward the inner-cabin side and the top end side of the seal lip makes elastic contact with the center pillar. Therefore, the high pressure water which. splashes the parting portion from the outer-cabin side straightly advances toward the center pillar through the parting portion, which is a direction perpendicular to an outer-cabin side surface of the center pillar, hits the seal lip and is turned in an angle of advancing along an outer-cabin side surface of the seal lip, which is a direction substantially in parallel with the outer-cabin side surface of the center pillar.

As a result, the high pressure water which splashes the parting portion advances while being bent at a substantially right angle, not straightly in a diagonally frontward direction as in the prior art. Such a structure prevents the high pressure water from directly hitting a triangular space fowled by the elastic contact between the hollow seal member of the front side weather strip and the center pillar.

The seal lip subjected to the high pressure water makes elastic contact with the center pillar and continues to be subjected to the high pressure water while making the elastic contact. The seal lip stably guides the high pressure water in a fixed direction, in which the triangular space is not directly hit by the high pressure water, without fluttering in an outer and inner cabin side direction as in the prior art.

Such a structure prevents the high pressure water from entering the inner-cabin side from the space between the front side weather strip and the center pillar, thereby preventing water leak.

In addition, according to the present invention, thickness of the top end of the seal lip is thicker than the thickness of at least one other curved part of the seal lip, or the top end of the seal lip is bent toward the outer-cabin side. Therefore, the high pressure water which splashes the parting portion from the outer-cabin side straightly advances toward the center pillar through the parting portion, hits the seal lip and then is greatly turned in the angle of returning to the outer-cabin side along the outer-cabin side surface of the seal lip.

The structure further prevents the high pressure water from directly hitting the triangular space formed by the elastic contact between the hollow seal member of the front side weather strip and the center pillar.

In addition, according to the present invention, the bending point is formed on the inner-cabin side of the border between the top end side of the seal lip made of the sponge material and the base root side made of the solid material, or is formed by providing the notch from the inner-cabin side. Accordingly, the bending point can be simply formed.

In addition, according to the present invention, the position on the outer-cabin side of the top end of the seal lip making elastic contact with the center pillar is on the outer-cabin side compared with the position of the tip on the rear door side of the hollow seal member of the front side weather strip making elastic contact with the center pillar and bending. Such a structure also prevents the high pressure water from directly hitting the triangular space.

DESCRIPTION OF PREFERRED EMBODIMENT

Referring to FIG. 1, FIG. 2, FIG. 7, FIG. 10 and FIG. 11, sealing structure of a parting portion according to an embodiment of the present invention will be described.

Figure 1:
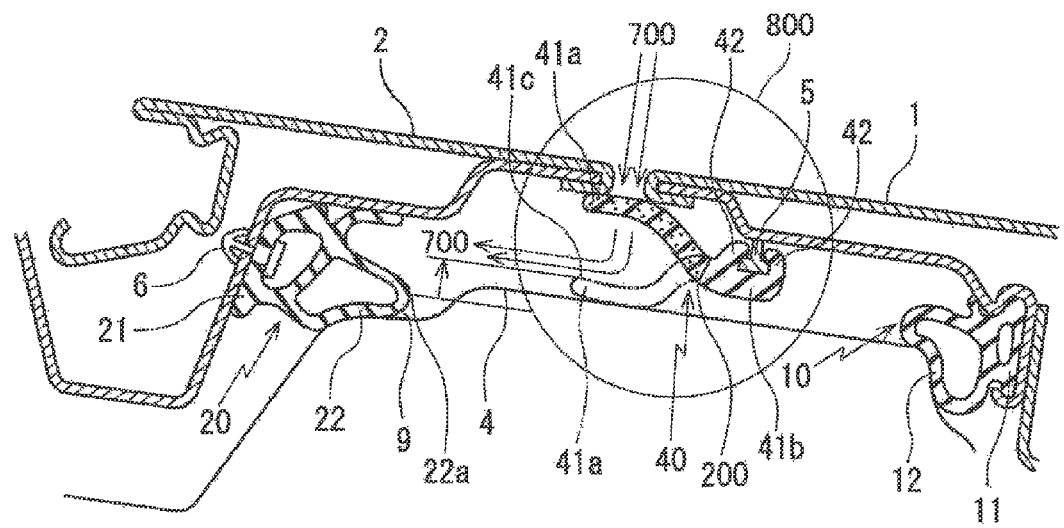
FIG. 1 is an I-I line enlarged cross section of FIG. 7, showing sealing structure of a parting portion according to an embodiment of the present invention.
Figure 2:
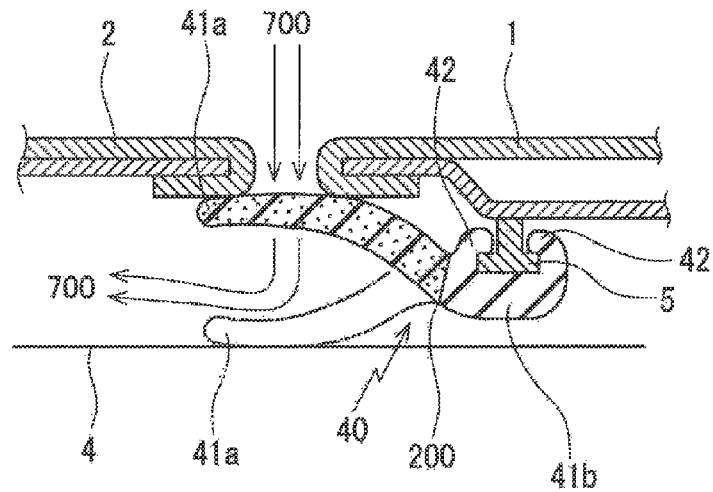
FIG. 2 is an enlarged cross section of part 800 of FIG. 1.
Figure 7:
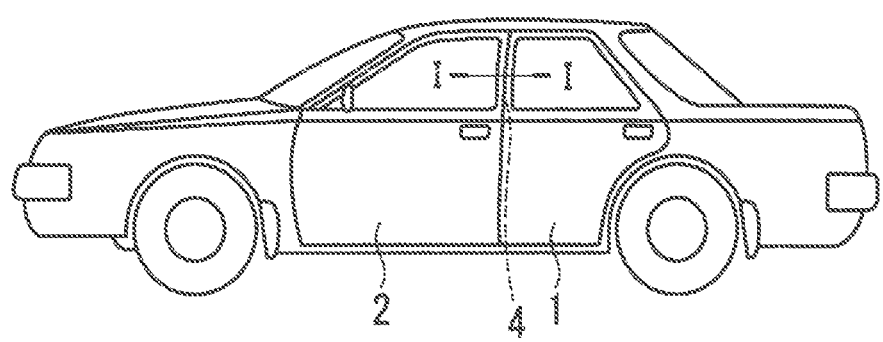
FIG. 7 is a side view of a four-door sedan.

FIG. 1 corresponds to an I-I line enlarged cross section of FIG. 7, showing sealing structure of a parting portion according to an embodiment of the present invention. FIG. 2 is an enlarged cross section of part 800 of FIG. 1. When constituents or items correspond to those in prior arts, the same symbols are used. Both the present invention and the prior art have the structures of FIG. 10 and FIG. 11.

Figure 8:
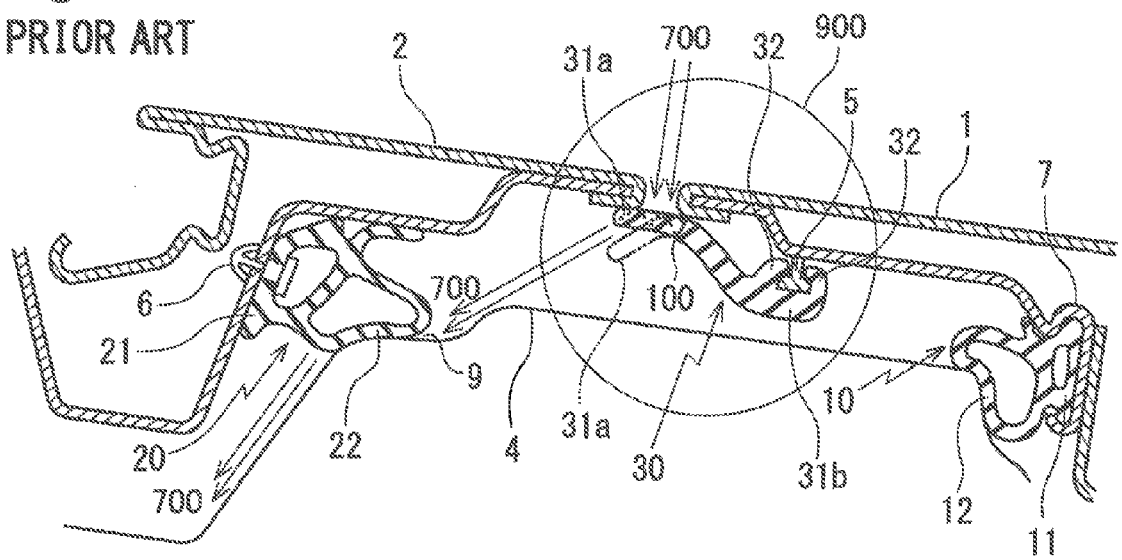
FIG. 8 is an I-I line enlarged cross section of FIG. 7, showing sealing structure of a parting portion according to a prior art.
Figure 9:
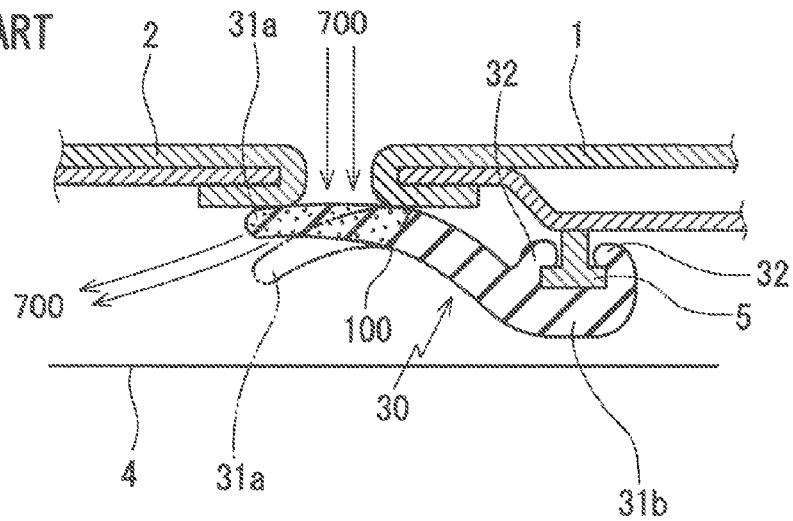
FIG. 9 is an enlarged cross section of part 900 of FIG. 8.
Figure 10:
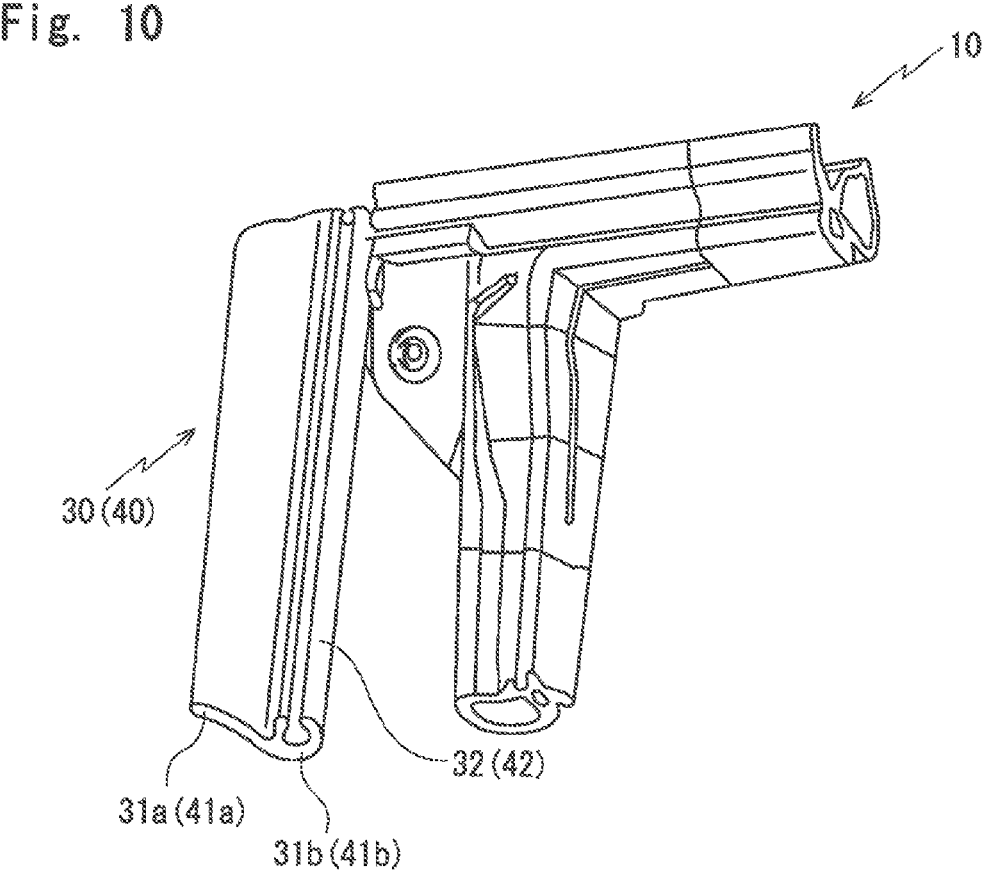
FIG. 10 is a perspective view showing an important part of a rear side weather strip.
Figure 11:
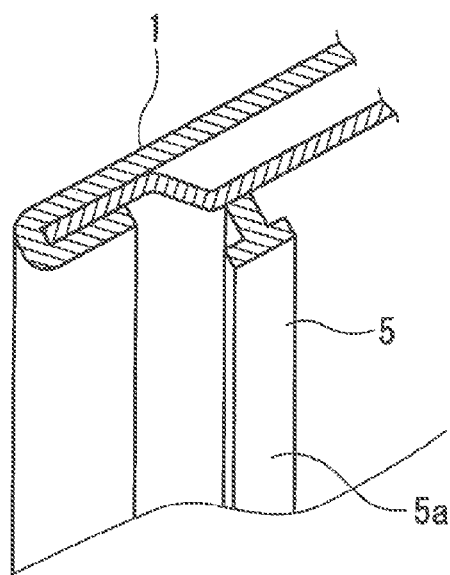
FIG. 11 is a perspective view showing an important part of a front end of a rear door of FIG. 7.

As shown in FIG. 10, according to the sealing structure of the parting portion, a seal lip 40 diverges from an upper part of a front end of a rear side weather strip 10 installed on a peripheral edge of a rear door 1 and extends downward. As shown in FIG. 1, the seal lip 40 closes and seals the parting portion between a rear end of a front door 2 and a front end of a rear door 1 from an inner cabin side. The seal lip 40 differs from a seal lip 30 of a prior art (FIG. 8 and FIG. 9) in a position of a bending point 200 in cross section, thereby differing from the seal lip 30 in a bent shape.

As shown in FIG. 1, when the front door 2 is closed, a hollow seal member 22 of a front side weather strip 20 of which an installation member 21 is installed on a peripheral edge of the front door 2 via a clip 6 makes elastic contact with an outer-cabin side on a front side of a center pillar 4. In the same manner, when the rear door 1 is closed, a hollow seal member 12 of a rear side weather strip 10 of which an installation member 11 is installed on a fitting part 7 formed by bending an inner panel on a peripheral edge of the rear door 1 makes elastic contact with the outer-cabin side on a rear side of the center pillar 4. As the hollow seal member 22 of the front side weather strip 20 makes elastic contact with the center pillar 4 and bends, a tip 22a on the rear door 1 side of the hollow seal member 22 stands out toward an outer-cabin side, thereby forming a triangular space 9 between the center pillar 4 and the tip 22a of the hollow seal member 22.

The seal lip 40 of the present embodiment has a substantially tongue-shaped cross section as shown in FIG. 2 and extends downward to a position of a belt line, The seal lip 40 has an assembly part 42 formed on a base root 41b side thereof. The assembly part 42 has the substantially U-shaped cross section and is assembled on the front end of the rear door 1 via a rail member 5. The rail member 5 has a substantially T-shaped cross section, is fixed on an inner-cabin side (inner-panel side) of a hemming-connected front end of the rear door 1 by welding or the like and continuously extends in an upward and downward direction. As a head 5a of the rail member 5 is guided into the assembly part 42 of the seal lip 40, the seal lip 40 is assembled on the rear door 1.

A top end 41a side of the seal lip 40 is made of sponge rubber material while the base root 4115 side is made of solid rubber material, and an inner cabinside of a border between the sponge material and the solid material is a bending point 200.

The bending point 200 is on the base root 41b side of the seal lip 40. In the present embodiment, the bending point 200 is on a position of the assembly part 42 as shown in FIG. 2. More specifically, substantially not less than two thirds on the top end 41a side of the whole seal lip 40 in cross section is made of the sponge rubber material while another substantially not more than one third on the base root 41b side is made of the solid rubber material (in the prior art, as shown in FIG. 9, substantially one third on a top end 31a side of a whole seal lip 30 in cross section is made of the sponge rubber material while another substantially two thirds on a base root 31b side is made of the solid rubber material).

As the bending point 200 is formed on the base root 41b side of the seal lip 40 for widening a range of the sponge rubber material compared with the prior art (FIG. 9), when high pressure water 700 splashes the seal lip 40 from the outer-cabin side through the parting portion while spraying water for washing the automobiles or thunderstorm, as illustrated by a two-dotted line in FIG. 1 and FIG. 2, the seal lip 40 is curved toward the inner-cabin side and the top end 41a side makes elastic contact with the center pillar 4.

In the present embodiment, the bending point 200 is on the position of the assembly part 42 of the seal lip 40, but the bending point 200 may he on any position which allows the seal lip 40 to be curved toward the inner-cabin side and the top end 41a side to make elastic contact with the center pillar 4 as illustrated by a two-dotted line in FIG. 1 and FIG. 2 when high pressure water 700 splashes the seal lip 40 from the outer-cabin side through. the parting portion.

In addition, as shown in FIG. 1, when the high pressure water 700 splashes the seal lip 40 and the inner-cabin side of the top end 41a of the seal lip 40 makes elastic contact with the center pillar 4, position on an outer-cabin side 41e of the top end 41a of the seal lip 40 is on the outer-cabin side compared with position of the tip 22a of the hollow seal member 22 of the front side weather strip 20.

According to the sealing structure of the parting portion of the present invention, the bending point 200 is provided on the base root 41b side of the seal lip 40 for closing the parting portion between the rear end of the front door 2 and the front end of the rear door 1 from the inner-cabin side so that the seal lip 40 is curved toward the inner-cabin side and the top end 41 a side makes elastic contact with the center pillar 4 when the high pressure water 700 splashes the seal lip 40 while spraying water for washing the automobile or the like. As a result, the high pressure water 700 which splashes the parting portion from. the outer-cabin side is forcibly bent at a substantially right angle. Such a structure prevents the high pressure water 700 from directly hitting the triangular space 9 formed by the elastic contact between the hollow seal member 22 of the front side weather strip 20 and the center pillar 4.

Such a structure prevents the high pressure water 700 from entering the inner-cabin side from the space between the front side weather strip 20 and the center pillar 4, thereby preventing water leak.

Figure 3:
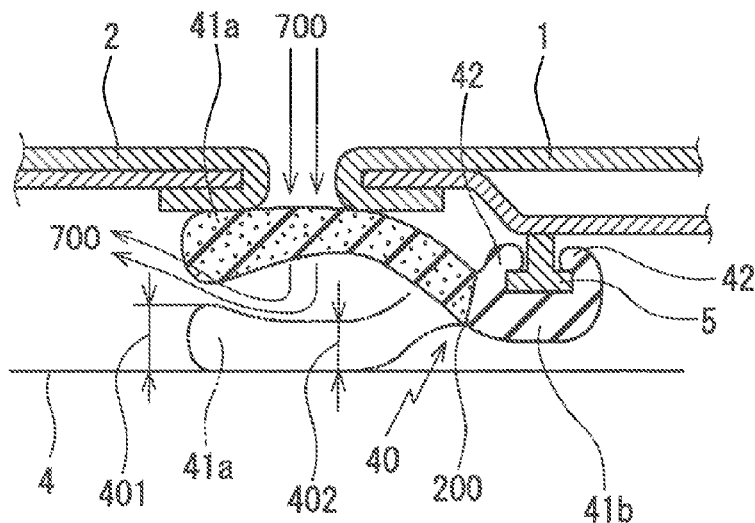
FIG. 3 is an enlarged cross section of another embodiment of part 800 of FIG. 1.

In addition, as shown in FIG. 3, thickness 401 of the top end 41a of the seal lip 40 may he thicker than the thickness 402 of at least one other curved part of the seal lip 40.

According to the structure, the high pressure water 700 which straightly advances toward the center pillar 4 through the parting portion and hits the seal lip 40 is turned in a greater angle of returning to the outer-cabin side as compared with FIG. 2. The structure further prevents the high pressure water 700 from directly hitting the triangular space 9.

Figure 4:
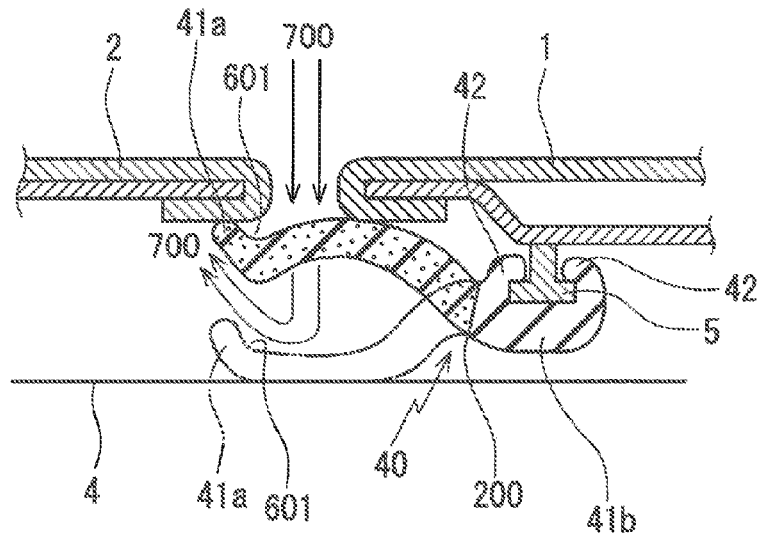
FIG. 4 is an enlarged cross section of another embodiment of part 800 of FIG. 1.

In addition, as shown in FIG. 4, the top end 41a of the seal lip 40 may be bent toward the outer-cabin side. In other words, the seal lip 40 of the present embodiment, having the thickness 401 which is thicker on the top end 41 a of the seal lip 40 than the thickness 402 as shown in FIG. 3, has a concave 601 provided on an outer-cabin side of the top end 41a thereof to be detailed later.

According to the structure, the high pressure water 700 which straightly advances toward the center pillar 4 through the parting portion and hits the seal lip 40 is turned in a still greater angle of returning to the outer-cabin side as compared with FIG. 2 and FIG. 3. The structure still further prevents the high pressure water 700 from directly hitting the triangular space 9.

Figure 5:
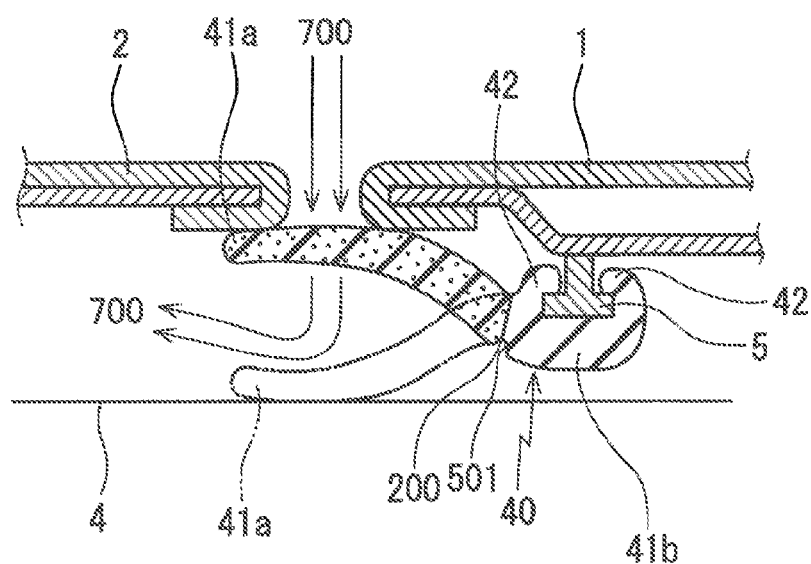
FIG. 5 is an enlarged cross section of another embodiment of part 800 of FIG. 1.

In addition., the bending point 200 may also be funned by providing a notch 501 from the inner-cabin side as shown in FIG. 5. In FIG. 5, since the notch 501 is on the inner-cabin side of the border between the sponge rubber material and the solid rubber material the resultant seal lip 40 bends more easily than the seal lip 40 of FIG. 2 without the notch 501. Alternatively, the seal lip 40 may be made of a singular material with the notch 501 provided thereon and make elastic contact with the center pillar 4.

Figure 6:
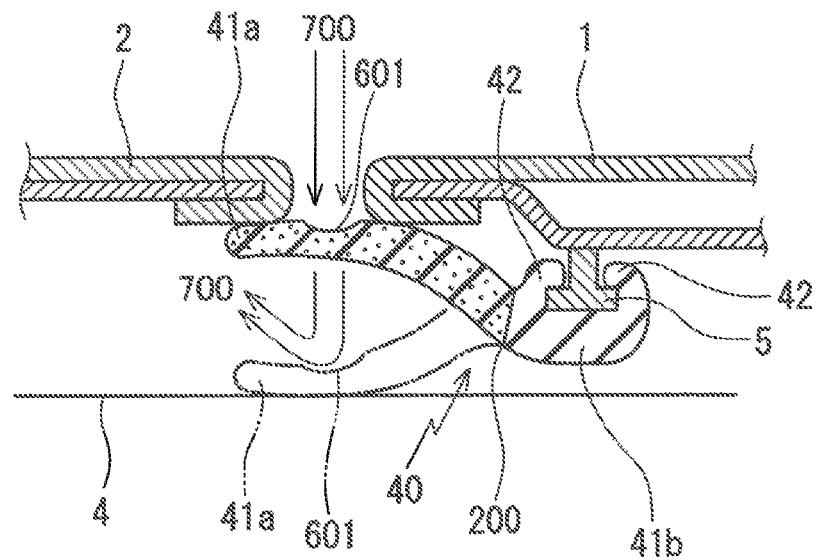
FIG. 6 is an enlarged cross section of another embodiment of part 800 of FIG. 1.

In addition, as shown in FIG. 6, the concave 601 may be provided on the outer-cabin side of the top end 41a of the seal lip 40 directly splashed with the high pressure water 700 from the parting portion.

According to the structure, the high pressure water 700 which straightly advances toward the center pillar 4 through the parting portion and hits the seal lip 40 is turned in a greater angle of returning to the outer-cabin side as compared with FIG. 2, The structure further prevents the high pressure water 700 from directly hitting the triangular space 9.

The seal lip 40 of the present embodiment has the assembly part 42 having the substantially U-shaped cross section formed on the base root 41b side thereof so that the seal lip 40 is assembled on the rail member 5 which is fixed on the front end of the rear door 1 and continuously extending in the upward and downward direction. But the seal lip 40 may have any structure as long as the base root 41b side of the seal lip 40 is assembled on the front end of the rear door 1. Examples of the structure include: a plurality of the rail members 5 provided at intervals instead of the rail member 5 continuously extending in the upward and downward direction; and, as disclosed in Japanese unexamined Patent Publication No. 2000-264065, a plurality of holes as the assembly part formed on the base root 41b side of the seal lip 40 with intervals from an upper and lower ends and corresponding protrusions provided on the front end of the rear door 1, which fit the plurality of holes.

The seal lip 40 of the present embodiment is made of the sponge rubber material and the solid rubber material. But the present invention is also applicable to sponge resin material or solid resin material of thermoplastic elastomer. Also, the top end 41a of the seal lip 40 may be made of any solid material of rubber or resin, not sponge, which is more pliant than the base root 41b.

The seal lip 40 according to the embodiment of the present invention diverges from the upper part of the front end of the rear side weather strip 10 and extends downward. In this connection, the seal lip 40 may be unified with the rear side weather strip 10, which is not separable from the rear side weather strip 10, or not unified with the rear side weather strip 10, which is separable from the rear side weather strip 10. Known methods of unifying the seal lip 40 with the rear side weather strip 10 include: thermally fusion bonding the seal lip 40 with a die-molded upper part of the front end of the rear side weather strip 10 while the upper part of the front end is being die-molded; and using adhesive between the seal lip 40 and the upper part of the front end of the rear side weather strip 10, which may be die-molded or not die-molded. A separable structure, not as the embodiment of the present invention in which the seal lip 40 diverges from the upper part of the front end of the rear side weather strip 10, may include an embodiment that has an obvious opening or space between the seal lip 40 and the rear side weather strip 10.

I claim:

1. A sealing structure of a parting portion for closing the parting portion between a rear end of a front door and a front end of a rear door by a seal lip from an inner-cabin side, the front door having a front side weather strip installed on a peripheral edge thereof, the front side weather strip making elastic contact with a center pillar, the seal lip having a substantially tongue-shaped cross section, the seal lip being disposed at an upper part of a front end of a rear side weather strip installed on a peripheral edge of a rear door and extending downward, the seal lip having an assembly part formed on a base root side thereof, the assembly part being assembled on the front end of the rear door, wherein the base root side of said seal lip has a bending point provided thereon for said seal lip to be curved toward the inner-cabin side so that a top end side makes elastic contact with said center pillar, and a direction of high pressure water which splashes the parting portion from an outer-cabin side is forcibly re-directed at an angle which is not more than a substantially right angle with respect to the direction of high pressure water when high pressure water splashes said seal lip.

2. The sealing structure of the parting portion as claimed in claim 1, wherein a thickness of the top end of said seal lip is thicker than a thickness of at least one other curved part of the seal lip.

3. The sealing structure of the parting portion as claimed in claim 2, wherein the top end of said seal lip is bent toward an outer-cabin side.

4. The sealing structure of the parting portion as claimed in claim 3, wherein the top end side of said seal lip is made of sponge material while the base root side is made of solid material, and said bending point is on the inner-cabin side of a border between the sponge material and the solid material.

5. The sealing structure of the parting portion as claimed in claim 4, wherein a position on an outer-cabin side of the top end of said seal lip making elastic contact with said center pillar is on the outer-cabin side compared with a position of a tip on the rear door side of a hollow seal member of said front side weather strip making elastic contact with said center pillar and bending.

6. The sealing structure of the parting portion as claimed in claim 3, wherein a position on an outer-cabin side of the top end of said seal lip making elastic contact with said center pillar is on the outer-cabin side compared with a position of a tip on the rear door side of a hollow seal member of said front side weather strip making elastic contact with said center pillar and bending.

7. The sealing structure of the parting portion as claimed in claim 2, wherein the top end side of said seal lip is made of sponge material while the base root side is made of solid material, and said bending point is on the inner-cabin side of a border between the sponge material and the solid material.

8. The sealing structure of the parting portion as claimed in claim 7, wherein a position on an outer-cabin side of the top end of said seal lip making elastic contact with said center pillar is on the outer-cabin side compared with a position of a tip on the rear door side of a hollow seal member of said front side weather strip making elastic contact with said center pillar and bending.

9. The sealing structure of the parting portion as claimed in claim 2, wherein a position on an outer-cabin side of the top end of said seal lip making elastic contact with said center pillar is on the outer-cabin side compared with a position of a tip on the rear door side of a hollow seal member of said front side weather strip making elastic contact with said center pillar and bending.

10. The sealing structure of the parting portion as claimed in claim 1, wherein the top end of said seal lip is bent toward an outer-cabin side.

11. The sealing structure of the parting portion as claimed in claim 10, wherein the top end side of said seal lip is made of sponge material while the base root side is made of solid material, and said bending point is on the inner-cabin side of a border between the sponge material and the solid material.

12. The sealing structure of the parting portion as claimed in claim 11, wherein a position on the outer-cabin side of the top end of said seal lip making elastic contact with said center pillar is on the outer-cabin side compared with a position of a tip on the rear door side of a hollow seal member of said front side weather strip making elastic contact with said center pillar and bending.

13. The sealing structure of the parting portion as claimed in claim 10, wherein a position on the outer-cabin side of the top end of said seal lip making elastic contact with said center pillar is on the outer-cabin side compared with a position of a tip on the rear door side of a hollow seal member of said front side weather strip making elastic contact with said center pillar and bending.

14. The sealing structure of the parting portion as claimed in claim 1, wherein the top end side of said seal lip is made of sponge material while the base root side is made of solid material, and said bending point is on an inner-cabin side of a border between the sponge material and the solid material.

15. The sealing structure of the parting portion as claimed in claim 14, wherein a position on an outer-cabin side of the top end of said seal lip making elastic contact with said center pillar is on the outer-cabin side compared with a position of a tip on the rear door side of a hollow seal member of said front side weather strip making elastic contact with said center pillar and bending.

16. The sealing structure of the parting portion as claimed in claim 1, wherein a position on an outer-cabin side of the top end of said seal lip making elastic contact with said center pillar is on the outer-cabin side compared with a position of a tip on the rear door side of a hollow seal member of said front side weather strip making elastic contact with said center pillar and bending.

17. The sealing structure of the parting portion as claimed in claim 1, wherein: said seal lip is curved toward the outer-cabin side; a top end of said seal lip is further bent toward the outer-cabin side and abuts the rear end of the front door; and a substantial center of said seal lip end of the rear door for closing the parting portion.

* * * * *